Patented June 16, 1936

2,044,046

UNITED STATES PATENT OFFICE 2,044,046

MIXTURES OF NATURAL RUBBER LATEX AND AQUEOUS DISPERSIONS OF RECLAIMED RUBBER

Arthur E. Barnard, Waterbury, and William E. Messer, Cheshire, Conn., assignors, by mesne assignments, to United States Rubber Company, New York, N. Y., a corporation of New Jersey No Drawing. Application February 16, 1934, Serial No. 711,556

6 Claims. (Cl. 134—17)

This invention relates to mixtures of natural rubber latex and aqueous dispersions of reclaimed rubber, more particularly aqueous dispersions of reclaimed rubber which have been made with soap as the hydrophilic colloid.

Naturally occurring rubber latex and certain types of aqueous dispersions of reclaimed rubber have been mixed with indifferent success in the past by conditioning either or both with dispersing or stabilizing colloidal materials before admixing in order to prevent subsequent incipient coagulation or gellation of the dispersed rubber particles. Aqueous soap dispersions of reclaimed rubber, by which is meant artificial aqueous dispersions of reclaimed rubber made with soap as the hydrophilic colloid or dispersing agent, have given the most difficulty in mixing with natural latex.

The present invention relates to stable compositions containing natural latex and aqueous soap dispersions of reclaimed rubber prepared in such a manner that they will not coagulate or gel on standing even after considerable periods of time.

According to the present invention, the aqueous soap dispersion of reclaimed rubber which is to be admixed with natural latex is so prepared that it has approximately the same osmotic pressure as the natural latex, and under such conditions the natural latex and the dispersion of reclaimed rubber may be admixed without subsequent coagulation or gellation. The aqueous soap dispersions of reclaimed rubber are prepared by dispersing reclaimed rubber, such as an alkali reclaim which has been digested or devulcanized in the presence of sodium hydroxide or potassium hydroxide and the usual plasticizing agents, in water by milling into the reclaim the desired soap as a dispersing agent and gradually adding water to the reclaim and soap mixture until a change of phase takes place and the rubber changes from the continuous phase into a dispersed phase in the aqueous medium. The method of preparing such aqueous dispersions of reclaimed rubber are well known in the art and are described in detail in the Pratt U. S. Patent 1,732,027 and in other Pratt patents such as 1,755,891, 1,755,892, 1,731,725, and 1,762,194. If desired, in lieu of utilizing a previously prepared soap as the dispersing agent the soap may be formed in situ. In this instance the free soap forming acid, e. g. abietic (rosin), oleic, stearic, palmitic, etc., is added first to the reclaimed rubber, either on the mill or in the internal mixer, and followed later in the mixer by the equivalent amount of dry ground caustic soda or potash after 4–15% water has been worked into the pulling mass. The osmotic pressure of the natural latex and the dispersion of reclaimed rubber may be measured in various ways as known to those skilled in the art, the measurements of relative osmotic pressure in the examples tabulated below, however, being made by the method of R. S. Lillie, Am. J. Physiol., vol. 20, p. 127, 1907–08. The osmotic pressures of the aqueous soap dispersions of reclaimed rubber are dependent on various factors, such as the type of reclaim, the kind of soap used as the hydrophilic colloid for dispersing the rubber, and the concentration of the rubber and soap in the dispersion of reclaimed rubber.

In the following table the various aqueous soap dispersions of reclaim were mixed with a natural latex of 38% solids and having a relative osmotic pressure of 34 cm. by the method of Lillie above referred to. The tables show various aqueous soap dispersions of reclaimed rubber, the relative osmotic pressure of the same, and the condition on mixing with the natural latex having a relative osmotic pressure of 34 cm. The first table gives various examples of whole tire reclaim, and the second table shows data relating to various tube reclaim.

Table 1

| Dispersion of reclaimed rubber—type of reclaim, kind of soap, and concentration of solids | Osmotic pressure of reclaimed rubber dispersion | Condition on mixing reclaimed rubber dispersion with natural latex having relative osmotic pressure of 34 cm. |
|---|---|---|
| | Cubic meters | |
| 1. Whole tire (NaOH) reclaim on 4% K rosinate—50% solids. | 60 | Coagulated at once. |
| 2. Whole tire (NaOH) reclaim on 4% K rosinate—28% solids (same as 1 supra diluted to 28% solids). | 34 | No coagulation or gellation after two months. |
| 3. Whole tire (KOH) reclaim on 4% K rosinate—50% solids. | 78 | Coagulated almost immediately. |
| 4. Whole tire (NaOH) reclaim on 4% K oleate—50% solids. | 45 | Gelled after 3–4 days. Coagulated in less than one month. |
| 5. Whole tire (KOH) reclaim on 4% K oleate—50% solids. | 34 | No coagulation or gellation after one month. |
| 6. Whole tire (NaOH) reclaim on 4% Na rosinate—50% solids. | 80 | Coagulated at once. |
| 7. Whole tire (NaOH) reclaim on 4% Na oleate—50% solids. | 47 | Gellation started after one month. |

Table 2

| Dispersion of reclaimed rubber—type of reclaim, kind of soap, and concentration of solids | Osmotic pressure of reclaimed rubber dispersion | Condition on mixing reclaimed rubber dispersion with natural latex having relative osmotic pressure of 34 cm. |
|---|---|---|
| | Cubic meters | |
| 1. Tube (NaOH) reclaim on 6% K rosinate—50% solids. | 45 | Coagulated within one hour. |
| 2. Tube (KOH) reclaim on 6% K rosinate—50% solids. | 48 | Coagulated within one hour. |
| 3. Tube (NaOH) reclaim on 6% K oleate—50% solids. | 35 | No coagulation or gellation after two months. |
| 4. Tube (KOH) reclaim on 6% K oleate—50% solids. | 32 | No coagulation or gellation after two months. |
| 5. Tube (NaOH) reclaim on 6% Na oleate—50% solids. | 33 | No coagulation or gellation after one month. |
| 6. Tube (NaOH) reclaim on 6% Na rosinate—50% solids. | 45 | Coagulation within thirty minutes. |

It will be seen from the above results that the mixing with natural latex of an isotonic aqueous soap dispersion of reclaimed rubber produces a mixture stable over an extended period of time. Convenient methods for adjusting the osmotic pressure of an artificial aqueous dispersion of rubber to agree with a natural latex so as to become isotonic with the same are (1) determination of percent colloid required in any reclaimed rubber dispersion to give the desired osmotic pressure at a definite solids concentration, and (2) dilution of the artificial dispersion until osmotic pressure agrees with that of the natural rubber latex. The second method is well illustrated in Table 1 above with respect to Examples 1 and 2. As shown there, a rosin soap dispersion of whole tire reclaim of 50% solids content (Example 1) with a relative osmotic pressure of 60 cm. when admixed with a natural latex having a relative osmotic pressure of 34 cm. coagulated at once. This same dispersion was diluted with water to 28% solids content to produce a dispersion with a relative osmotic pressure of 34, (Example 2), and a mixture of this diluted dispersion with the latex was stable and showed no tendency to coagulate after two months. On the other hand if the osmotic pressure of the dispersion is too low, e. g. less than 34 cm., then additional soap may be added to raise osmotic pressure to the desired level.

From the above tables, it is seen that natural rubber latex may be admixed satisfactorily with an aqueous soap dispersion of reclaimed rubber having approximately the some osmotic pressure as the natural latex. So long as the aqueous soap dispersion of reclaimed rubber has approximately the same osmotic pressure as originally present in the natural latex, the natural latex may have its osmotic pressure artificially changed, as for example by the addition of soap prior to admixture with the dispersion of reclaim without effecting the stability of the final system adversely. It is only necessary that the natural latex before any such treatment have approximately the same osmotic pressure as the dispersion of reclaim which is to be mixed therewith. It is not entirely satisfactory, however, to adjust a natural latex to a higher osmotic pressure than normal, as by the addition of soap, in order to have the osmotic pressure of the treated latex equal the osmotic pressure of an artificial dispersion of the reclaim before admixing. Similarly, a "processed" latex, where certain of the serum solids have been removed, will not give entirely satisfactory results, even if the relative osmotic pressures of such a processed latex and the dispersion of reclaimed rubber are equal at the time of mixing. In the latter cases, it has been found more satisfactory to restrict any adjustment of osmotic pressure to the artificial aqueous dispersion rather than to the natural aqueous dispersion. Furthermore, for practical purposes it is desirable to adjust the osmotic pressure of the reclaim dispersion to that originally occurring in the natural latex prior to any "processing" which might modify the serum solids, etc. rather than to any final osmotic pressure of the latex system after processing. In other words it is more important that the osmotic pressure of the reclaim dispersion be in agreement with and based on the osmotic pressure of the natural rubber latex as it normally occurs rather than with or on any later osmotic pressure resulting from processing such latex. Once the osmotic pressure of the reclaim dispersion is in agreement with the initial osmotic pressure of the natural latex it appears that no further adjustment is required and the latex may be added at once or after processing steps without reducing the stability of final mixture. The order of mixing, that is adding the latex to the dispersion or vice versa, appears to make no difference provided that the dispersion of reclaimed rubber has approximately the same osmotic pressure as the natural latex with which it is mixed.

While specific embodiments of the invention have been described, it is obvious that numerous modifications may be made therein and it is not desired to limit the invention otherwise than as set forth in the appended claims.

Having thus described our invention, what we claim and desire to protect by Letters Patent is:

1. The method of making a stable composition containing natural rubber latex and an aqueous soap dispersion of reclaimed rubber comprising preparing an aqueous soap dispersion of alkali reclaimed rubber having approximately the same osmotic pressure as the natural latex and mixing the said dispersions.

2. A stable composition comprising natural rubber latex and an aqueous soap dispersion of alkali reclaimed rubber having approximately the same osmotic pressure as the natural latex.

3. The method of preparing a stable mixture containing natural rubber latex and an aqueous dispersion of reclaimed rubber comprising mixing with natural latex an isotonic aqueous soap dispersion of alkali reclaimed rubber.

4. A stable composition comprising natural rubber latex and an isotonic aqueous soap dispersion of alkali reclaimed rubber.

5. The method of preparing a stable mixture containing natural rubber latex and an aqueous dispersion of alkali reclaimed rubber comprising mixing with natural latex a reclaimed rubber dispersion which has been dispersed on the amount and type of soap forming constituents necessary to provide an artificial aqueous dispersion at any desired total solids content isotonic with the natural rubber latex.

6. The method of preparing a stable mixture containing natural rubber latex and an aqueous dispersion of alkali reclaimed rubber comprising mixing with natural latex an aqueous soap dispersion of reclaimed rubber which has been diluted to a total solids content necessary to provide the same osmotic pressure as normally occurring in the natural rubber latex.

ARTHUR E. BARNARD.
WILLIAM E. MESSER.

CERTIFICATE OF CORRECTION.

Patent No. 2,044,046.  June 16, 1936.

ARTHUR E. BARNARD, ET AL.

It is hereby certified that error appears in the printed specification of the above numbered patent requiring correction as follows: Page 1, second column, line 38, in the table, center column, for "Cubic meters" read Centimeters; page 2, first column, line 8, in the table, center column, for "Cubic meters" read Centimeters; and that the said Letters Patent should be read with these corrections therein that the same may conform to the record of the case in the Patent Office.

Signed and sealed this 8th day of September, A. D. 1936.

(Seal)

Leslie Frazer
Acting Commissioner of Patents.